Sept. 15, 1925.  
E. G. LEWIS  
1,553,542
AUTOMOBILE HEADLIGHT
Filed Feb. 1, 1924
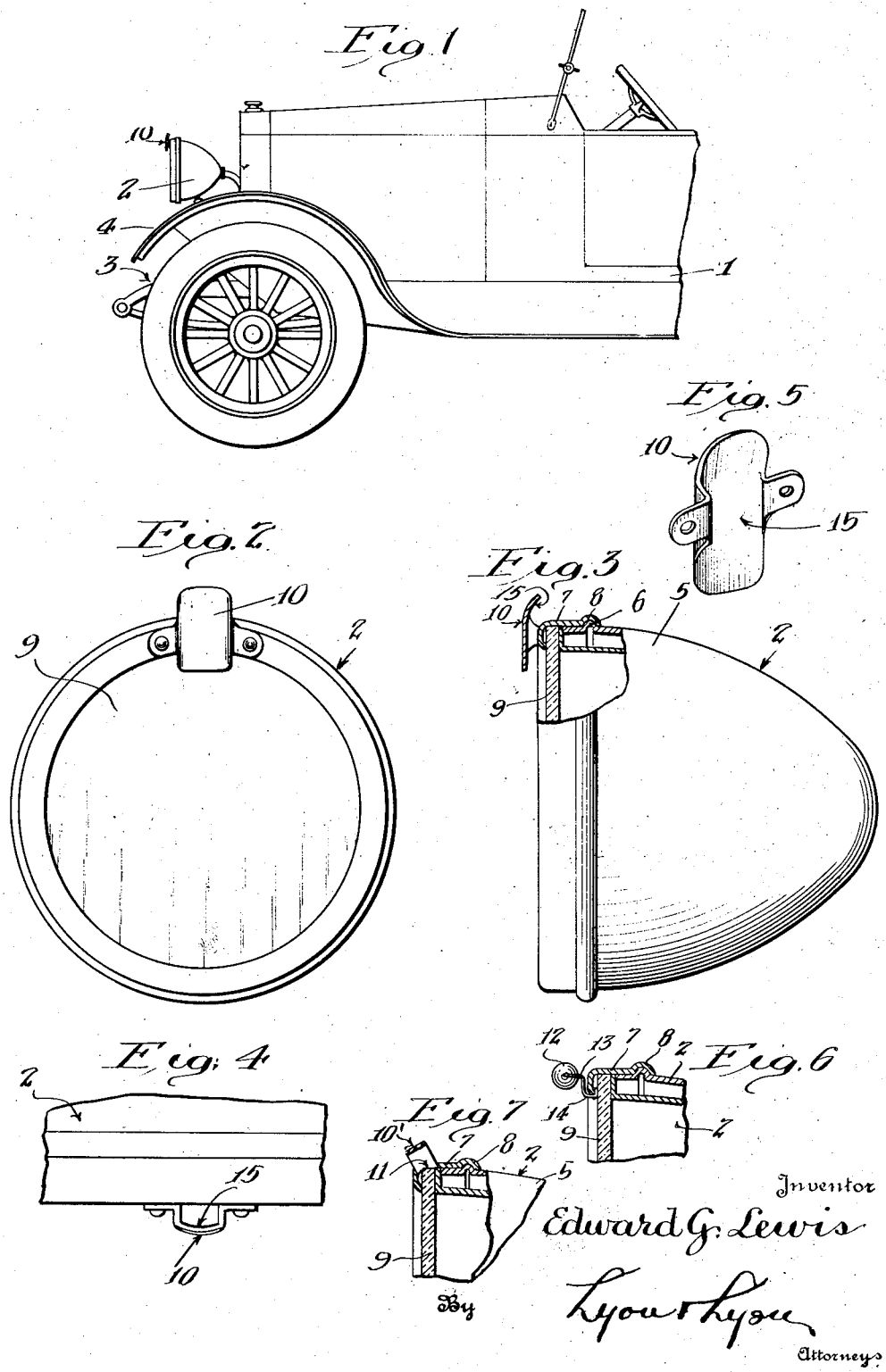

Patented Sept. 15, 1925.

1,553,542

UNITED STATES PATENT OFFICE.

EDWARD G. LEWIS, OF LOS ANGELES, CALIFORNIA, ASSIGNOR TO MABLE G. LEWIS, OF ATASCADERO, CALIFORNIA.

AUTOMOBILE HEADLIGHT.

Application filed February 1, 1924. Serial No. 689,875.

*To all whom it may concern:*

Be it known that I, EDWARD G. LEWIS, a citizen of the United States, residing at Los Angeles, in the county of Los Angeles, State of California, have invented a new and useful Improvement in Automobile Headlights, of which the following is a specification.

This invention relates to automobile headlights and is more particularly directed to a device for determining from the driver's seat of the automobile whether or not the headlights are burning.

Headlights, as connected to most automobiles, as well as the bulbs used in the headlights, are of such a nature that it frequently occurs that the connection is broken or one of the bulbs of one of the headlights is burned out while the automobile is being driven along the highway. It is practically impossible, with headlights as now constructed, to determine this fact from the driver's seat. However, this impossibility to determine whether or not both lights are burning does not in any manner lessen the degree of danger caused to the occupants of that automobile or to other automobiles on the same highway. An object of this invention is to provide a simple and sure means of warning the driver of an automobile that one or both of his headlights is not burning.

An object of this invention is to provide such an attachment to automobile headlights that will not destroy the beauty and design of the headlights.

An object of this invention is to provide an attachment to automobile headlights, or a part which may be integral with the headlights, such that a strong beam of light will not be reflected toward the occupants of the automobile to impair their vision.

Other objects of this invention will be apparent from the following detailed description of a preferred embodiment of this invention, as illustrated by the accompanying drawing:

In the drawing:

Figure 1 is a side elevation of an automobile showing a headlight adapted thereto embodying this invention.

Fig. 2 is a front elevation of an automobile headlight showing one form of embodiment of this invention.

Fig. 3 is a side elevation of a headlight, partly in section, embodying this invention.

Fig. 4 is an enlarged fragmental top view thereof.

Fig. 5 is a perspective view showing one form of a light deflecting means which may be used in connection with this invention.

Fig. 6 is a fragmental sectional view showing another embodiment of this invention.

Fig. 7 is likewise a fragmental side elevation showing another form embodying this invention as pressed or secured to the glass retaining rim of an automobile headlight.

In the drawing, 1 generally indicates an automobile having headlights 2 secured to the automobile frame 3 or to fenders 4 in any desired manner. The outer frame 5 of the automobile headlight 2 has a lip 6 pressed therein. A rim 7 having a lip 8 is adapted to hold the glass 9 to the headlight frame 5. A U-shaped light deflecting member 10 is secured to the front of the rim 7, as shown in Figure 1. The U-shaped member 10 may be formed as a portion of the rim 7, as shown in Figure 7, or a hole 11 may be punched in the rim 7 and a member 10' secured to the rim 7 directly over the hole 11.

The embodiment of this invention shown in Figure 6 consists of a small ball 12 having a polished surface, which ball 12 is held in place on the front of the headlight 2 by means of a pair of spaced wires 13, which wires 13 are secured to opposite points on the ball 12.

Wires 13 may terminate as U-shaped members 14 which are adapted to be pressed under the rim 7 between the glass and the said rim to hold the said ball 12 in position.

The underside 15 of the members 10 may be polished so that the light from the headlight may be more effectively reflected.

The operation of this invention is as follows:

Light from the reflectors of the headlight strikes the reflecting members 10 or, as in the case of the embodiment shown in Figure 7, the light from the headlight strikes the glass and a portion of the light is diffused to a position where the member 10 is positioned and is then deflected through the hole 11 to strike the under bright surface 15 of the member 10. The driver of the automobile, by looking at his headlights from his seat, will immediately observe whether or not the headlights of his automobile are burning. Should one light be out, he is immediately warned and may stop and fix the same.

Having fully described preferred embodiments of my invention, it is to be understood that the same may be varied in detail without departing from the spirit of the invention as pointed out in the following claim.

I claim:—

In an automobile headlight, the combination of a frame, reflecting means positioned within said frame, a rim secured to the frame, deflecting means secured to the front of said rim, said deflecting means including a vertically extending plate curved rearwardly at its upper end, and extending laterally on each side of said rim, one of said extensions being observable by the operator of said automobile telling of the burning of the light in said headlight.

Signed at Los Angeles, California, this 24 day of January, 1924.

EDWARD G. LEWIS.